United States Patent [19]
Hayashi et al.
[11] 3,927,420
[45] Dec. 16, 1975

[54] FREQUENCY DEPENDENT COMPENSATING CIRCUIT FOR MAGNETIC RECORDING SIGNALS

[75] Inventors: Kenji Hayashi, Kamakura; Yasufumi Yumde; Kotaro Kawamura, both of Yokohama, all of Japan

[73] Assignee: Hitachi, Ltd., Japan

[22] Filed: Nov. 2, 1973

[21] Appl. No.: 412,153

[30] Foreign Application Priority Data

Nov. 6, 1972 Japan ........................... 47-110330

[52] U.S. Cl. ...................... 360/65; 330/69; 360/26
[51] Int. Cl.$^2$ ...................... G11B 5/45; H03F 3/45
[58] Field of Search .................. 360/24, 25, 26, 65; 330/69; 333/29

[56] References Cited

UNITED STATES PATENTS

| | | | |
|---|---|---|---|
| 2,828,478 | 3/1958 | Johnson | 360/26 |
| 3,048,664 | 8/1962 | Drukey | 360/65 |
| 3,436,490 | 4/1969 | Roelofs | 360/65 |

*Primary Examiner*—Bernard Konick
*Assistant Examiner*—Jay P. Lucas
*Attorney, Agent, or Firm*—Craig & Antonelli

[57] ABSTRACT

A magnetic recording and/or reproducing apparatus for audio signals whose frequency to phase characteristic is linear and which comprises a correcting circuit to increase the gain in the high frequency components thereby compensating for the loss of the high frequency components of the reproduced signal which otherwise may occur. The correcting circuit comprises at least one delay circuit, means for obtaining a signal with a predetermined time delay $\tau$ and a $2\tau$ delay signal, means for adding a no delay signal to the $2\tau$ delay signal, and means for subtracting the added signal from the $\tau$ delay signal.

3 Claims, 10 Drawing Figures

FREQUENCY DEPENDENT COMPENSATING CIRCUIT FOR MAGNETIC RECORDING SIGNALS

BACKGROUND OF THE INVENTION

1. Field of the Invention

The present invention relates to a magnetic recording and/or reproducing apparatus, and more particularly to a magnetic recording and/or reproducing apparatus for audio signals with high fidelity by means of a correcting circuit which is adapted to modify not only the frequency to amplitude characteristic but also the frequency to phase characteristic in recording and reproducing.

2. Description of the Prior Art

There has been found a sharply sloping down in the region of high frequencies of the frequency characteristic in recording and reproducing by a recording and reproducing apparatus due to various reasons relating to self-demagnetization, a distribution of the magnetic field in the head gap, the length of the head gap, a gap between the head and the recording medium, eddy-current loss of the head, et cetera.

Generally, the magnetic recording and/or reproducing apparatus is designed so as to compensate for such a sharply sloping down in the high frequency region of reproduced signals and to make the frequency range of recorded signals as wide as possible. The conventional way of correcting for the loss of high frequency components of the recorded or reproduced signals is to utilize a resonance circuit including inductive component L and a capacitive component C and whose frequency characteristic sharply rises due to resonance at a given frequency region which is determined to substantially meet with the high frequency region where the frequency characteristic of recording or reproducing signals sharply falls down. In a recording and reproducing apparatus adapted to be especially used for recording and reproducing music, such an LC resonance circuit is employed for obtaining a frequency to amplitude characteristic with a flat shape even at the high frequency region.

However, the phase variation with increase in frequency is not linear, and is abrupt particularly at the frequencies in the vicinity of the resonance frequency in the frequency to phase characteristic of the conventional correcting circuit employing the LC resonance circuit.

The non-linearity of the frequency to phase characteristic causes envelope distortion of audio signals when the apparatus is used for recording a voice, thus resulting in deterioration of the voice quality. Further it produces pulse distortion or ringing when the apparatus is used for recording pulse signals, thus giving the reduction of a recording density.

By the way, it has been considered that the effects of such phase characteristic may be negligible when hearing with human ears. Accordingly, no attention has been paid to the problem of the frequency to phase characteristic and the conventional apparatus has been designed merely to obtain a flat frequency to amplitude characteristic even at the high frequency region.

SUMMARY OF THE INVENTION

An object of the present invention is to provide a magnetic recording and/or reproducing apparatus with high fidelity.

Another object of this invention is to provide a magnetic recording and/or reproducing apparatus whose frequency to phase characteristic for reproducing signal is linear.

A further object of the present invention is to provide a magnetic apparatus in which the reproduced signal is less distorted.

Still another object of this invention is to provide a magnetic recording and/or reproducing apparatus suitable for recording pulse signals with high recording density.

The present invention results from the experimental fact that human ears are sensitive to the effects of the phase characteristic of the reproducing signal, and that the fidelity of the reproducing signal can be improved if the phase to frequency characteristic is substantially linear over the entire range of the frequencies. Thus, the features of the present invention reside in that correction for the loss of high frequency components in a reproduced signal, which may occur during reproduction for various reasons as abovementioned, is made by a circuit having a frequency characteristic adapted to intensify the high frequency range of the signal as well as a linear frequency to phase characteristic. This enables the apparatus according to this invention to attain high fidelity in recording an original signal and reproducing therefrom.

The above and other objects, features and advantages will be apparent from the following detailed description taken in connection with the accompanying drawings.

DESCRIPTION OF THE PREFERRED EMBODIMENTS

Figures 1A, 1B:
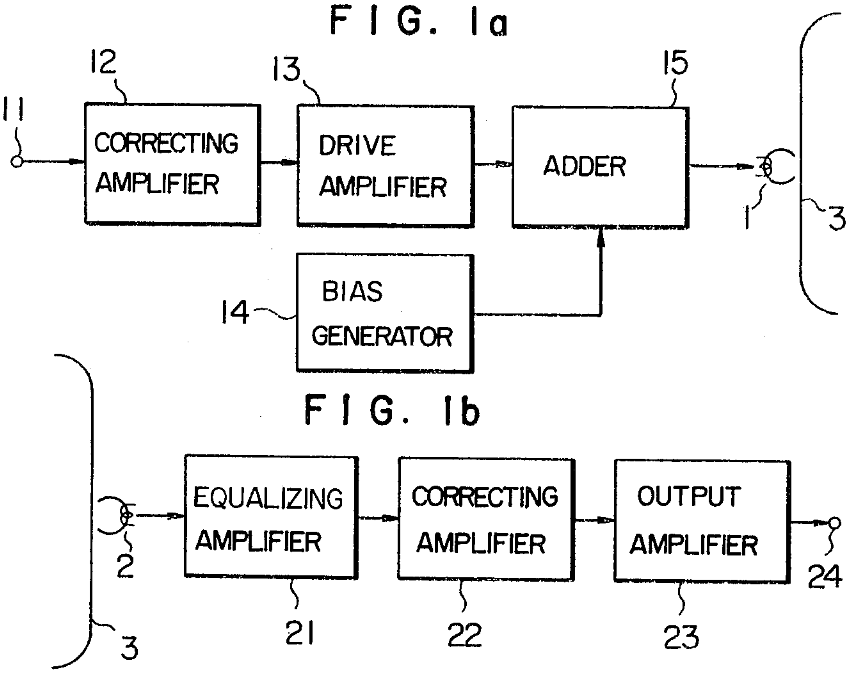
FIG. 1*a* is a block diagram of a recording unit of a magnetic recording and/or reproducing apparatus.
FIG. 1*b* is a block diagram of a reproducing unit of the apparatus in FIG. 1*a*.

FIG. 1*a* shows a block diagram of a recording unit of a magnetic recording and/or reproducing apparatus and FIG. 1*b* is a block diagram of a reproducing unit of the same. In FIG. 1*a*, the reference numeral 1 designates a recording head, the numeral 3 a magnetic recording medium such as a magnetic tape, the numeral 11 an input terminal for a recording signal, the numeral 12 a correction amplifier for recording, the numeral 13 a drive amplifier for operating the recording head 1, the numeral 14 a bias signal generator, and the numeral 15 a summing device of the bias signals. IN FIG. 1*b*, the reference numeral 2 designates a reproducing head which may be common for recording and reproducing in case where the apparatus is applicable to both recording and reproducing, the numeral 21 an equalizing amplifier, the numeral 22 a correction amplifier for reproduction, the numeral 23 an output amplifier, and the numeral 24 an output terminal.

In recording operations, an input signal applied to the input terminal 11 is supplied to the bias signal summing device 15 through the correction amplifier 12 for recording and the drive amplifier 13. The input signal and a bias signal derived from the bias signal generator 14 are summed at the summing device 15, and then the summed signal is applied to the magnetic recording medium 3 which is running. The magnetic recording medium is drived by a driving system (not shown). On the other hand, in reproducing operations, as the magnetic recording medium 3 is run the signal recorded thereon is detected by the reproducing head 2 which in turn is supplied to the equalizing amplifier 21. The detecting signal bearing a differential characteristic due to magnetic reproducing operations is equalized by the equalizing amplifier 21 bearing an integration characteristic and then is passed through the correction amplifier 22 and the output amplifier 23 to the output terminal 24 connected to an external circuit (not shown). It appears that the schematic construction as illustrated by the block diagrams is substantially identical to the conventional magnetic recording and reproducing apparatus except for minor differences in connection.

Figure 2:
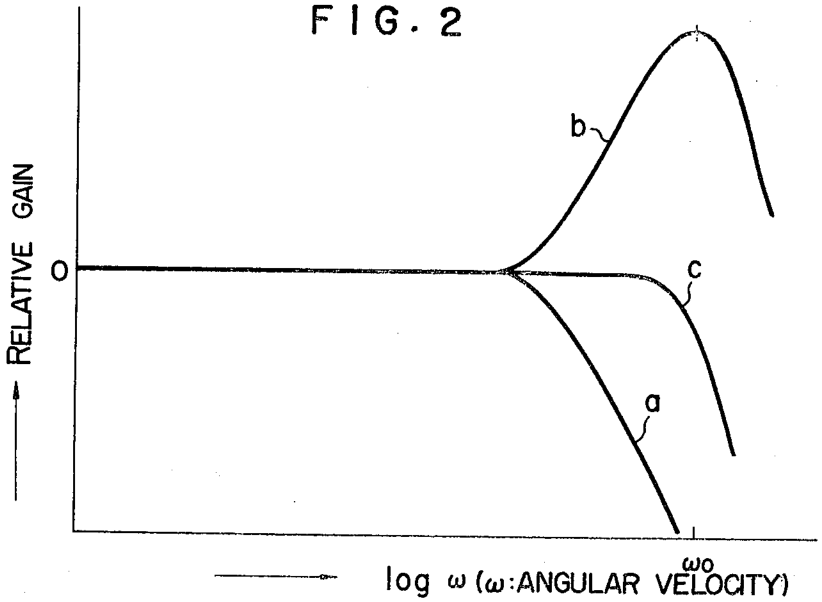
FIG. 2 shows a graph of the frequency to amplitude characteristic of the magnetic recording and/or reproducing apparatus.

The main feature of this invention exists in the characteristic of the correcting amplifier 12 for recording and the correcting amplifier 22 for reproducing, shown in FIGS. 1*a* and 1*b*. The frequency to amplitude characteristics of these amplifiers are adaptable to correct for the sharply sloping down of the gain in the high frequency components of signals to be recorded or reproduced and their frequency to phase characteristics are linear. In FIG. 2 the frequency characteristics of the reproducing or detecting signal of the magnetic recording and reproducing apparatus are illustrated. In the figure, the absissa indicates the frequency of the reproducing signal with a logarithm scale, while the ordinate indicates the relative gain with a logarithm scale or a unit of dB. The curve *a* shows the sharply sloping down characteristic caused by various reasons as described above. The frequency characteristic as shown by the curve *a*, which is typical for a conventional recording and reproducing apparatus, is corrected to a frequency characteristic *c* by utilizing the correction amplifier 12 or 22 which has a frequency characteristic as shown by the curve *b*.

Figure 3:
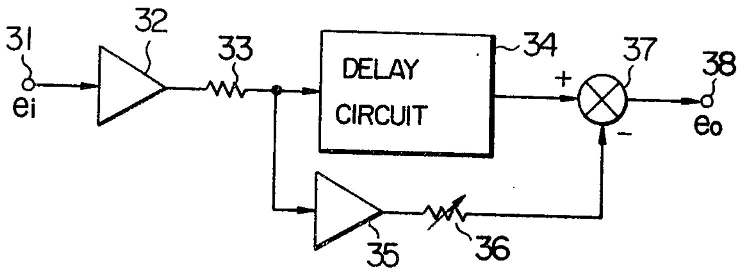
FIG. 3 is a block diagram of an embodiment of a correcting circuit according to this invention.

FIG. 3 is a block diagram of an embodiment of an essential part of the correction amplifier 12 or 22 having a frequency characteristic as shown by the curve *b* in FIG. 2. In FIG. 3, the reference numeral 31 represents an input terminal, the numerals 32 and 35 buffer amplifiers, the numeral 33 a resistor for impedance matching, the numeral 36 a variable resistor, the numeral 37 a subtractor, and the numeral 38 an output terminal.

The input signal $e_i$ applied to the input terminal 31 is impressed on the amplifier 32. The output signal of the buffer amplifier 32 as a voltage source is applied through the resistor 33 to a delay circuit 34. The resistor 33 serves as a matching impedance for the delay circuit 34. The output of the delay circuit 34 is dismatched with a high input impedance of the subtractor 37. Accordingly, the signal applied to the delay circuit 34 is supplied to the subtractor 37 with a delay $\tau$ of the delay circuit, while a part of the signal is reflected at the output terminal of the delay circuit and transmitted to the input terminal of the delay circuit therethrough. The reflected signal from the output terminal of the delay circuit 34 is no more reflected at the input terminal thereof because the resistor 33 is connected to the input terminal for impedance matching. The signal appearing at the input of the delay circuit 34 is the resultant signal composed of the output signal of the buffer amplifier 32 and a $2\tau$ delay signal of the same. The resultant signal is supplied to the subtractor 37 through the buffer amplifier 35 and the variable resistor 36. The output signal of the subtractor 37 has a value obtained by subtracting the resultant signal from the output signal of the delay circuit 34. The output signal $e_o$ appearing at the output terminal 38 is given $$\begin{aligned} e_o &= A_1\epsilon^{j\omega(t-\tau)} - A_1A_2\,G\left\{\epsilon^{j\omega(t-2\tau)} + \epsilon^{j\omega t}\right\} \\ &= A_1\epsilon^{j\omega(t-\tau)}\left\{1 - A_2\,G(\epsilon^{j\omega\tau} + \epsilon^{-j\omega\tau})\right\} \\ &= A_1\epsilon^{j\omega(t-\tau)}(1 - 2A_2G\cos\omega\tau) \\ &= A_1(1 - 2A_2G\cos\omega\tau)\epsilon^{-j\omega\tau}\cdot e_i \end{aligned} \quad (1)$$

where $A_1$ = transfer factor of the amplifier 32
$A_2$ = transfer factor of the amplifier 35
$G$ = *transfer factor of the variable resistor 36*
$e_i = \epsilon^{j\omega t}$ = input signal Hence, we see that $$H(\omega) = \frac{e_o}{e_i} = A_1(1 - 2A_2G\cos\omega\tau)\epsilon^{-j\omega\tau} \quad (2)$$

where $H(\omega)$ is a transfer function of the circuit shown in FIG. 3. Consequently, the frequency to amplitude characteristic is expressed $$A_1(1 - 2A_2G\cos\omega\tau)$$

The frequency to phase characteristic is expressed by $\epsilon^{-j\omega\tau}$, thus being of linearity, so that the delay is $\tau$ at any frequency within the entire operating frequency range. The frequency to amplitude characteristic depends on the transfer factor of the variable resistor 36 and the delay time $\tau$ of the delay circuit 34. Accordingly, the angular frequency $\omega_o$ at which the maximum gain is obtained is $\pi/\tau$, while the ratio of the maximum to the minimum gain is $20\log[(1+2A_2G)/(1-2A_2G)]$ (dB).

By suitably selecting these values, it is possible to correct the high frequency characteristics in recording and reproducing.

That is, the value of $\tau$ is determined from the angular frequency $\omega_o$, at the frequency range around which the amplitudes of signals to be reproduced are reduced greatly as shown by the curve *a* in FIG. 2 and therefore required to be corrected. By adjusting the resistance value of the resistor 36 and the transfer factor of the amplifier 35 so that the amplitudes of the signals around the angular frequency $\omega_o$ become almost equal to those in the low frequency range, the desired correction will be achieved.

That is, the frequency to amplitude characteristic of the circuit becomes as shown by the curve *b* in FIG. 2 and the resultant frequency characteristic of the apparatus becomes as shown by the curve *c* in FIG. 2.

Figures 4A, 4B:
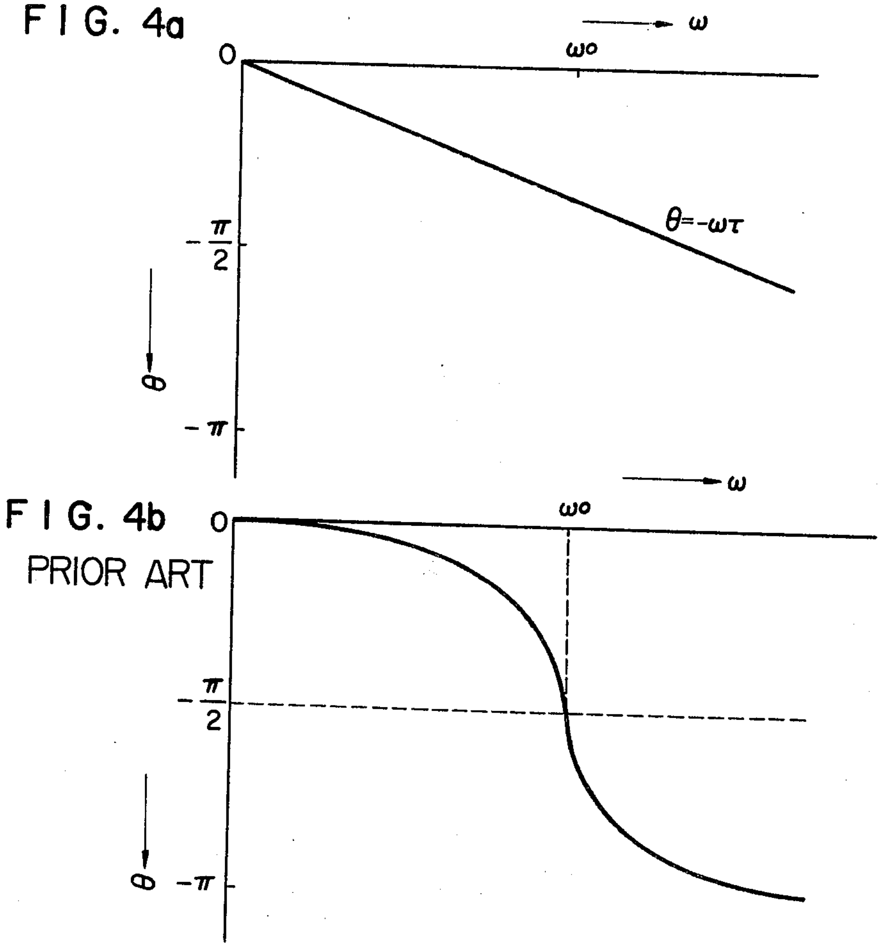
FIG. 4a FIG. 4b PRIOR ART
FIG. 4*a* is a frequency to phase characteristic curve of the correcting circuit shown in FIG. 3.
FIG. 4*b* is a frequency to phase characteristic curve of the correcting circuit of the prior art.

The frequency to phase characteristic of the correction circuit as shown in FIG. 3 is represented by an equation $\theta = -\omega\tau$ or a linear line as shown in FIG. 4*a* in which the abscissa indicates an angular frequency $\omega$ and the ordinate indicates a phase delay $\theta$ (radian).

In the correction circuit according to the present invention, the desired frequency characteristic is obtainable by selecting the values of the transfer function G of the variable resistor 36, the delay time $\tau$ of the delay circuit 34 and then the frequency $\omega_o$ which are to be determined in consideration of the frequency characteristic of an apparatus to which the correction circuit is incorporated. It is to be noted that, in this case, the change of the delay time $\tau$ merely results in the change of the inclination of the characteristic line in FIG. 4*a* without any deterioration of the linearity of the characteristic line.

Figure 5:
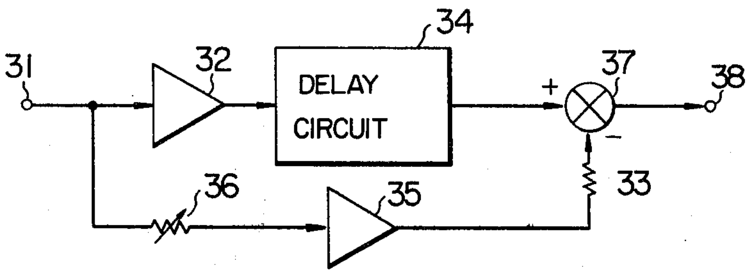
FIG. 5 through FIG. 7 show block diagrams of other embodiments of the correcting circuit according to this invention.
Figure 6:
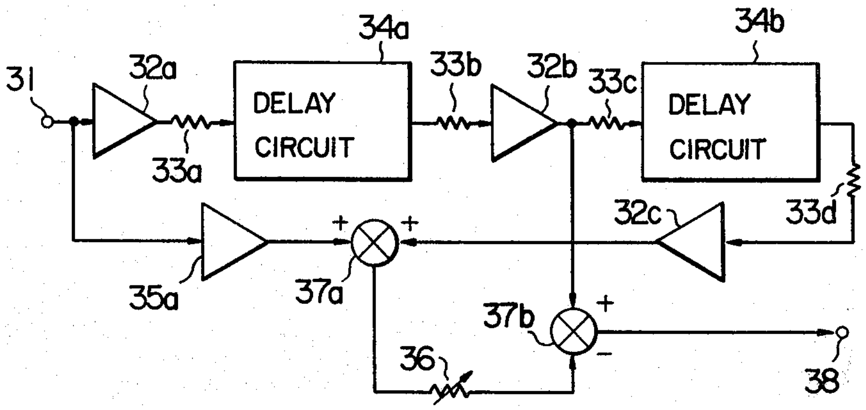
Figure 7:
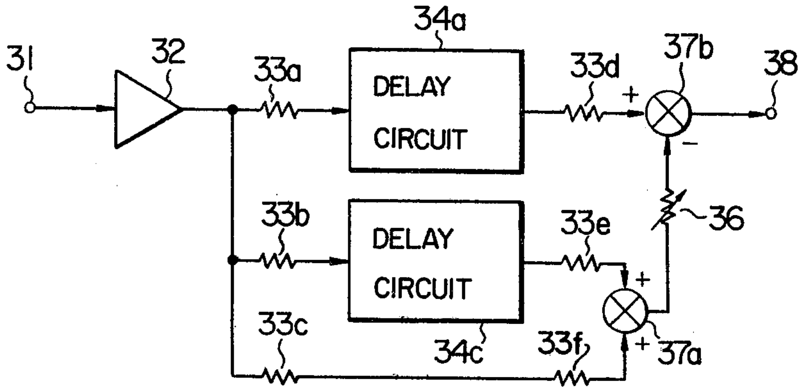

FIG. 5 through FIG. 7 show other embodiments of the correction circuit having such excellent characteristics. In these drawings, the same numerals refer to the same parts.

It will be noted that all of these circuits are constructed in the same manner as in the circuit of FIG. 3 that the output signal appearing at the output terminal is the difference between a signal lagging behind the input signal at the input terminal by $\tau$ and, the sum of the input signal and a signal lagging behind the input signal by $2\tau$.

The circuits of FIG. 5 and FIG. 3 are substantially identical in the constitutional elements, but are slightly different in the wiring therebetween. The subtractor 37 may be omitted if the phases of the outputs of the buffer amplifiers 32 and 35 are opposite and hence the subtraction can be effected merely by connecting the output terminal of the delay circuit 34 to the end of the resistor 33. The delay circuit 34 is arranged in such a way that the output impedance thereof is matched by means of the resistor 33 while the input impedance is on mismatching. The input signal at the input terminal 31 passes through two routes: one is the path consisting of the buffer amplifier 32 and the delay circuit 34; the other is the path consisting of the variable resistor 36, the buffer amplifier 35 and the resistor 33. The input signal passing through the former route is delayed $\tau$ by the delay circuit 34. This signal is not reflected at the output terminal of the delay circuit 34 because the output impedance of the delay circuit is matched by means of the resistor 33. The input signal passing through the latter path reaches the subtractor and then some of the signal further travels toward the input of the delay circuit 34 through the subtractor 37 and the output of the delay circuit, and is reflected at the input of the delay circuit. The reflected signal appears at the subtractor with a time lag of $2\tau$. Accordingly, if the output signals of the buffer amplifiers 32 and 35 are out of phase with phase angle of 180°, the relation expressed by the equation (2) above mentioned, may be applicable to this circuit, That is to say, the circuit in FIG. 5 is the correcting circuit whose phase characteristic is linear.

The circuits of FIG. 3 and FIG. 5 are common in that the reflection at one end of the single delay circuit 34 is utilized for obtaining the $2\tau$ delay. An embodiment using two delay circuits is shown in FIG. 6. In the figure, the delay circuits 34*a* and 34*b* have the same delay of $\tau$. The delay circuits 34*a* and 34*b* are provided with the resistors 33*a* through 33*d* for impedance matching of the inputs and the outputs impedance thereof.

The input signal applied to the input terminal 31 reaches the adder 37*a* after passing through the buffer amplifier 32*a*, the resistor 33*a*, the delay circuit 34*a*, the resistor 33*b*, the buffer amplifier 32*b*, the resistor 33*c*, the delay circuit 34*b*, the resistor 33*d*, and the buffer amplifier 32*c*. The output signal of the buffer ampllifier 32*c* is delayed $2\tau$ from the input signal. The input signal at the input terminal 31 also is applied through the buffer amplifier 35*a* to the adder 37*a* with no delay. The $2\tau$ delay signal from the buffer amplifier 32*c* and the non-delayed signal from the buffer amplifier 35*a* are added at the adder 37*a*, and then the resultant signal is supplied to the subtractor 37*b* through the variable resistor 36. The resultant signal is subtracted from a $\tau$ delay signal of the buffer amplifier 32*b* at the subtractor 37*b* thereby producing an output signal at the terminal 38. The two input signals to the adder 37*a* are required to have the same amplitude. The adjustment of the amplitudes of these input signals may be made by adjusting the gain of the buffer amplifiers 32*a*, 32*b*, 32*c*, 32*d* and 35*a*.

FIG. 7 shows another embodiment of the correcting circuit using two delay circuits, in which the delay circuit 34*a* has a delay of $\tau$, and another delay circuit 34*c* has a delay of $2\tau$. The input signal flows through a buffer amplifier 32 and then into three branches: the first branch is comprised of a resistor 33*a*, the delay circuit 34*a*, and a resistor 33*d;* the second of resistors 33*b* and 33*e*, and the delay circuit 34*c;* the third of resistors 33*c* and 33*f*. The resistors 33*a* and 33*d* are provided for impedance matching of the input and the output of the delay circuit 34*a* while the resistors 33*b* and 33*e* are used for impedance matching of the delay circuit 34*c*. The resistors 33*c* and 33*f* are used for adjusting the amplitude of the signal therethrough so as to be equal to that of the signal from the delay circuit 34*c* because an adder 37*a* requires both the input signals thereto to be the same in amplitude. The signal via the second branch with a delay of $2\tau$ is added by the adder 37*a* to the signal through the third branch. The resultant signal is supplied to a subtractor 37*b* through a variable resistor 36. The signal via the first branch with a delay of $\tau$ is supplied to the subtractor 37*b*. In the subtractor 37*b*, the resultant signal of the signal with a delay of $2\tau$ and the signal without delay is subtracted from the signal with a delay of $\tau$ thereby producing an output signal at the terminal 38.

Figure 8:
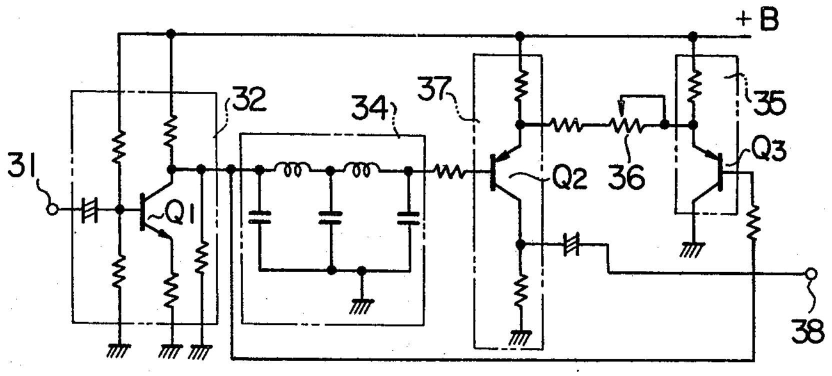
FIG. 8 shows a block diagram of the correcting circuit shown in FIG. 3.

FIG. 8 shows a circuit diagram of the correcting circuit shown in FIG. 3, in which the same reference numerals refering to the blocks of dotted lines refer to the same blocks in FIG. 3. In FIG. 8, the reference character $Q_1$ is a transistor of the buffer amplifier 32, the reference character $Q_3$ is a transistor of the buffer amplifier 35, and $Q_2$ refers to a transistor of the subtractor 37.

Comparing with the prior art, there is no difference in the frequency to amplitude characteristic of the correcting circuit between the present invention and the prior art, but there is a remarkable difference in the frequency to phase characteristic therebetween, as shown in FIG. 4*a*. The experiment shows that the magnetic recording and reproducing apparatus using the compensating circuit of the present invention provides considerably excellent tone quality than that of the prior art.

The effects of the present invention are obtainable by eliminating the non-linearity of the frequency to phase characteristic which has been unavoidable in the conventional correcting circuit. The correcting circuit of this invention is especially useful when it is applied to an apparatus being sensitive to the non-linearity of the phase characteristic such as a cassette taperecorder which otherwise may exhibit a large loss of the high frequency components in recording or reproducing.

In case the device of the present invention is applied to the apparatus whose recording medium runs at high speed, the application of the device of the present invention may be done only to the recording side thereof. This is because the loss of the high frequency component mainly occurs on the recording side.

It is apparent from the foregoing that since the linearity of the frequency to phase characteristic over the entire frequency range enables the recording and/or reproducing apparatus to record and/or reproduce an original signal with high fidelity, it is enough to compensate the phase characteristic in consideration of whose components which may affect the phase characteristic of the apparatus.

We claim:

1. A magnetic recording apparatus for audio signals including means for correcting for the reduction in amplitude of a signal with the increasing of the frequency thereof on recording the signal on a recording medium, said means for correcting comprising:

- a delay circuit having input and output terminals and adapted to delay a signal passed therethrough by a delay time of $\tau$,
- means for providing said delay circuit with impedance matching at only one of said input and output terminals,
- means for applying an input signal to be recorded to said input terminal of said delay circuit, thereby producing a first delay signal delayed by $\tau$ from said input signal at said output terminal thereof,
- means for applying said input signal to be recorded to the one impedance-matched terminal to have said input signal reflected at the other terminal, thereby providing at said one terminal a second delay signal delayed by $2\tau$ from said input signal,
- means for adding said input signal to said second delay signal, and
- means for producing a difference between said first delay signal and the addition of said input signal and said second delay signal.

2. A magnetic recording and reproducing apparatus for audio signals in which each of the recording and reproducing circuits is provided with means for correcting for the reduction in amplitude of a signal with the increasing of the frequency thereof when the signal is recorded on a recording medium, said correcting means provided in the recording circuit comprising:

- a delay circuit having input and output terminals and adapted to delay a signal passed therethrough by a delay time of $\tau$,
- means for providing said delay circuit with impedance matching at only one of said input and output terminals,
- means for applying an input signal to be recorded to said input terminal of said delay circuit, thereby producing a first delay signal delayed by $\tau$ from said input signal at said output terminal thereof,
- means for applying said input signal to be recorded to the one impedance-matched terminal to have said input signal reflected at the other terminal, thereby providing at said one terminal a second delay signal delayed by $2\tau$ from said input signal,
- means for adding said input signal to said second delay signal, and
- means for producing a difference between said first delay signal and the addition of said input signal and said second delay signal.

3. In a magnetic recording and/or reproducing apparatus for audio signals including means to correct for the loss of high frequency components of signals to be reproduced, said means comprising:

- a delay circuit for providing a predetermined time delay of $\tau$;
- means for impedance matching only one of the input and output sides of said delay circuit;
- means to supply said delay circuit with an input signal, thereby obtaining a signal with a delay of $\tau$;
- means to sum an input signal without delay and a signal with a delay of $2\tau$ which is obtained by passing the input signal through said delay circuit from said impedance matched one side and reflecting said input signal at the other side to return to said one side; and
- means to obtain a difference between said summed signal and said signal with a delay of $\tau$.

* * * * *